(12) United States Patent
Suhre et al.

(10) Patent No.: US 10,793,039 B2
(45) Date of Patent: Oct. 6, 2020

(54) HEADREST ASSEMBLY WITH FLEXIBLE SUPPORT STRUCTURE AND STRETCHED FABRIC COVER

(71) Applicant: B/E Aerospace, Inc., Winston-Salem, NC (US)

(72) Inventors: Ryan J. Suhre, Winston-Salem, NC (US); Stephen A. Puglisi, Greensboro, NC (US); Paul E. Neil, IV, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/275,036

(22) Filed: Feb. 13, 2019

(65) Prior Publication Data

US 2020/0254915 A1  Aug. 13, 2020

(51) Int. Cl.
*B60N 2/879* (2018.01)
*B64D 11/06* (2006.01)
*B60N 2/80* (2018.01)

(52) U.S. Cl.
CPC .......... *B60N 2/879* (2018.02); *B64D 11/0626* (2014.12); *B64D 11/0646* (2014.12); *B60N 2002/899* (2018.02)

(58) Field of Classification Search
CPC .. B60N 2/809; B60N 2002/899; B60N 2/879; B60N 2/821; B60N 2/812; B64D 11/0626; B64D 11/0646
USPC .................................................. 297/391, 410
See application file for complete search history.

(56) References Cited

U.S. PATENT DOCUMENTS

| 419,961 | A | * | 1/1890 | Knoll | B60N 2/809 297/391 |
|---|---|---|---|---|---|
| 479,585 | A | * | 7/1892 | Cherrington | B60N 2/809 297/391 |
| 3,512,605 | A | * | 5/1970 | McCorkle | H04R 5/023 381/301 |
| 6,666,517 | B2 | * | 12/2003 | Clough | B60N 2/885 297/410 |
| 7,500,721 | B2 | * | 3/2009 | Beroth | B60N 2/821 297/410 |
| 7,744,158 | B2 | | 6/2010 | Schürg et al. | |
| 9,611,041 | B2 | | 4/2017 | Baker et al. | |
| 2013/0232696 | A1 | * | 9/2013 | Halimi | A47C 16/00 5/640 |
| 2017/0197529 | A1 | | 7/2017 | Hontz et al. | |

* cited by examiner

*Primary Examiner* — Milton Nelson, Jr.
(74) *Attorney, Agent, or Firm* — Suiter Swantz pc llo

(57) ABSTRACT

A headrest assembly including a plate attachable to a front side of a seat back, a flexible support structure attached to the plate, and a continuous fabric cover stretched over the flexible support structure and tensioned to create a hollow pocket behind the fabric cover and forward of the plate to allow the fabric cover to depress inward toward the plate in response to loading on a center portion of the fabric cover. The flexible support may be a flexible wire frame having symmetrical side portions angled away from the plate to induce a concave curve in the fabric cover to cradle the head of a seat occupant. The assembly may further include an adjustment mechanism for adjusting the position of the headrest relative to the seat back.

8 Claims, 10 Drawing Sheets

HEADREST ASSEMBLY WITH FLEXIBLE SUPPORT STRUCTURE AND STRETCHED FABRIC COVER

BACKGROUND

Vehicle seats such as aircraft passenger seats are commonly equipped with headrests to enhance comfort for the head and neck. Most conventional headrest constructions feature solid cushioning applied over a rigid support. Rigid supports and solid cushions tend to be heavy, inflexible, and compatible with only certain fabric types. Importantly, such constructions are not able to accommodate all head sizes and shapes, and thus are constructed to best accommodate only the mean passenger anatomy.

In a drive toward a more comfortable and universal headrest, headrest constructions have been modified to incorporate adjustable features. For example, adjustable side supports may be utilized to adjust headrest width and angle to better support the head in certain sitting and sleeping positions. While beneficial for comfort, adjustable features tend to be underutilized and are often entirely overlooked by the passenger. When discovered, such mechanisms often require manual actuation of cumbersome and failure-prone mechanisms. Further, adjustable mechanisms tend to be complex and add weight to headrest constructions, making them undesirable for use in aircraft applications.

Other conventional headrest constructions utilize solid cushions and knitted fabrics. Aircraft flammability requirements prevent the use of adequately flexible fabrics when applied over solid cushions, resulting in stiff headrests that tend to push the head forward in an uncomfortable manner. Furthermore, constructions including knitted fabrics applied tightly over solid cushions tend to be heavy and difficult to remove and replace soiled or damaged fabrics.

Accordingly, it would be desirable to provide a universal headrest solution for a headrest construction that overcomes the disadvantages of conventional headrest constructions. A desirable headrest construction would be lightweight, simple with few or no moving parts, easily customizable and serviceable, and comfortable in various sitting and sleeping positions, among other benefits and advantages.

SUMMARY OF THE INVENTIVE ASPECTS

To achieve the foregoing, the inventive aspects disclosed herein are directed to a headrest assembly including a plate attachable to a seat back, a flexible support structure attached to the plate, and a fabric cover stretched over the flexible support structure to create a hollow pocket behind the fabric cover.

In some embodiments, the flexible support structure may be a flexible wire frame having a shape that induces a concave curve in a center portion of the fabric cover for cradling a head of a seat occupant.

In some embodiments, the flexible wire frame may have a center portion parallel to the plate and side portions that extend forward in a direction away from the plate.

In some embodiments, the side portions may be symmetrical, curved and angle outward.

In some embodiments, the fabric cover may be tensioned on the flexible support structure.

In some embodiments, the fabric cover may be continuous and may have a smooth surface texture.

In some embodiments, the fabric cover may be perforated.

In some embodiments, the headrest assembly may be devoid of solid cushioning.

In some embodiments, the headrest assembly may further include at least one of a speaker and an air vent disposed in the hollow pocket.

Further aspects of the inventive concepts disclosed herein are directed to a seat back plate attachable to a front side of a seat back, a headrest plate movably coupled to the seat back plate, an adjustment mechanism for adjusting a position of the headrest plate relative to the seat back plate, a flexible support structure attached to the headrest plate, and a fabric cover stretched over the flexible support structure to create a hollow pocket behind the fabric cover.

In some embodiments, the flexible support structure may be a flexible wire frame having a shape that induces a concave curve in a center portion of the fabric cover for cradling a head of a seat occupant.

In some embodiments, the flexible wire frame may have a center portion parallel to the plate and side portions that extend forward in a direction away from the plate, wherein the side portions are symmetrical, curved and angle outward.

In some embodiments, the fabric cover may be tensioned on the flexible support structure.

In some embodiments, the adjustment mechanism may include spaced guide rails attached to one of the seat back plate and the headrest plate, and a guide attached to the other one of the seat back plate and the headrest plate, the guide disposed between the spaced guide rails and carrying rollers engaged to roll along the spaced guide rails and friction members engaging the spaced guide rails.

In some embodiments, the friction members may be biased toward their respective one of the spaced guide rails.

Further aspects of the inventive concepts disclosed herein are directed to a passenger seat including a seat back and a headrest assembly attachable to a front side of the seat back, wherein the headrest assembly includes a headrest plate, a flexible wire frame attached to the headrest plate, and a fabric cover stretched over the flexible wire frame and tensioned to create a hollow pocket behind the fabric cover.

In some embodiments, the flexible wire frame may have a shape that induces a concave curve in a center portion of the fabric cover for cradling a head of a seat occupant.

In some embodiments, the flexible wire frame may have a center portion parallel to the plate and side portions that extend forward in a direction away from the plate, and wherein the side portions are symmetrical, curved and angle outward.

In some embodiments, the assembly may further include a seat back plate attached to the front side of the seat back and an adjustment mechanism movably coupling the headrest plate to the seat back plate.

In some embodiments, the adjustment mechanism may include spaced guide rails attached to one of the seat back plate and the headrest plate, and a guide attached to the other one of the seat back plate and the headrest plate, the guide carrying rollers engaged to roll along the spaced guide rails.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DESCRIPTION OF ILLUSTRATIVE EMBODIMENTS

Figure 1:
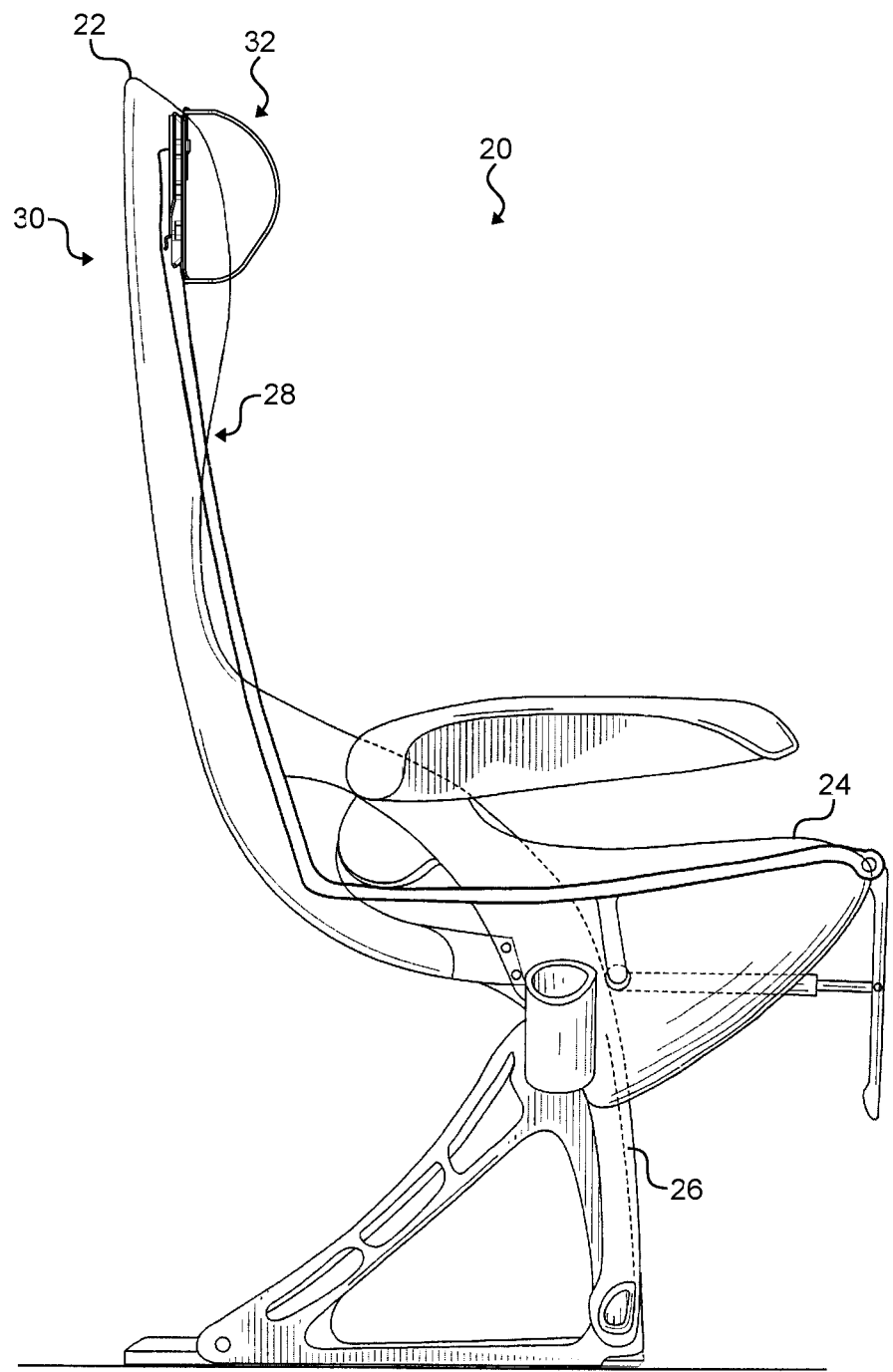
FIG. 1 is a side view of an exemplary passenger seat equipped with an attachable headrest according to one embodiment of this disclosure.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

With reference to the drawing figures, disclosed herein are inventive aspects of a headrest assembly attachable to and adapted for use with numerous passenger seat constructions such as aircraft passenger seats. The headrest assembly may include little or no solid cushioning. Instead, a fabric cover is stretched over a flexible wire frame. The stretched fabric cover is tensioned on the frame to create a hollow pocket behind the fabric cover that allows at least a center portion of the fabric cover to depress inward to support and absorb the head and/or neck. Symmetrical side portions of the frame extend forward to allow the fabric cover to depress farther inward at the center as compared to the sides. The flexible wire frame induces a concave curve in the fabric cover that cradles the head of the seat occupant for better comfort as compared to conventional headrest constructions.

Whereas conventional headrests include rigid supports, the wire frame utilized in the headrest construction disclosed herein is flexible. In a non-limiting example, the flexible support structure may be a bent metal wire or the like having a three-dimensional shape that functions like a spring. In use, the metal wire stretches or bends when loaded and returns to an original resting position in the absence of a load. The flexible support structure generally includes a center portion attached to and continuous with a support plate attachable to a seat, and symmetrical side or lateral portions that extend forward relative to the plate. The wire frame defines the general shape of the headrest, while the fabric cover conceals the frame and finished the look of the headrest. The headrest is sufficiently wide to accommodate any head size. The wide spacing and forward-extending side portions induce a concave curve in the front portion of the fabric cover in use that cradles the head.

FIG. 1 shows a non-limiting example of an aircraft passenger seat construction 20. The passenger seat may be an economy class, premium economy class, or other passenger seat generally including a seat back 22, a seat bottom 24, and a base frame 26 attachable to the floor. The seat back 22 has a front side 28 and a back side 30. The headrest assembly 32 is attachable to the front side 28, either directly or through other components as discussed further below. The headrest assembly 32 extends generally forward of the seat back 22 to support the head and/or neck in various sitting and sleeping positions.

Figure 2:
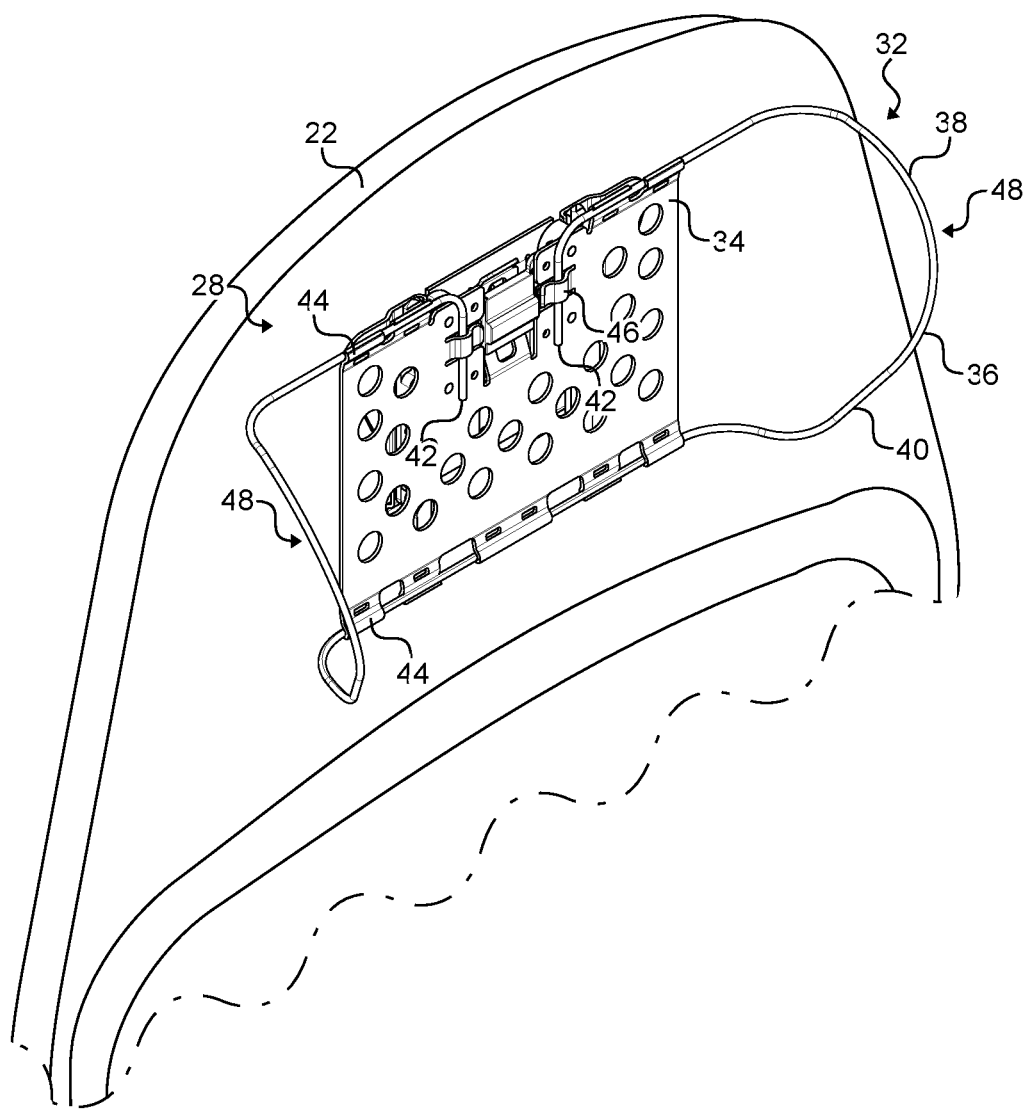
FIG. 2 is a fragmentary perspective of a seat back and attached headrest assembly.

FIG. 2 shows the headrest assembly 32 attached to the front side 28 of the seat back 22. The seat back construction generally includes coverings applied over structural frame members. The coverings may include structural and/or non-structural shrouds and close-outs, made from hard and/or soft materials, that can be decorative as well as conceal the structural frame members to give the seat a finished look. The headrest assembly 32 generally includes a headrest plate 34 and a flexible support structure 36 attached to the headrest plate. In an exemplary embodiment, the flexible support structure may be a flexible wire frame 38. The flexible wire frame 38 may be constructed from metal wire 40 bent to define a predetermined three-dimensional shape. The metal wire 40 may be continuous from one end to the other. The wire ends 42 may be collocated and attached to the headrest plate 34, while other portions of the metal wire may be routed alongside the headrest plate and yet other portions of the metal wire may extend away from the headrest plate in the lateral and/or forward directions.

The headrest plate 34 is attachable to the seat back, either directly to a seat back frame member or other seat component, or indirectly being coupled to a seat back plate or an adjustment mechanism as discussed further below. The headrest plate 34 may be generally planar having a thin profile. The headrest plate 34 may be made from metal and may have lightening holes for weight savings advantageous for aircraft applications. The headrest plate 34 may be constructed from stamped and bent metal to provide a unitary construction. Cutouts in the plate may serve to locate and attach components, such as portions of the wire frame and components of an adjustment mechanism. Wire guides 44 positioned spaced-apart along the top and bottom edges of the headrest plate 34 serve to retain and guide portions of the metal wire 40 along the headrest plate. The wire guides 44 may alternate contact sides of the metal wire 40 to help retain the metal wire to the headrest plate and guide the metal wire without the need for a permanent attachment solution. Catches 46 symmetrically-arranged about the center of the headrest plate 36 serve to retain the wire ends 42.

The flexible wire frame 38 generally determines the overall headrest shape, which can be customized. As shown, a portion of the flexible wire frame 38 is parallel to and coplanar with the headrest plate 34. The parallel frame portions extend laterally away from the headrest plate 34 on both sides and transition into symmetrical side portions 48 that serve to hold the fabric cover in an expanded configuration and tensioned to support the head, as well as induce a concave shape in the center of the fabric cover in use. The side portions 48 extend forward and are angled outward to support the head when tilted to one side or the other in addition to angling the front of the side portions away from head impacts. The side portions 48 may be gradually curved from top-to-bottom from comfort and safety and may have a vertical taper from top-to-bottom or bottom-to-top. One or more of the angle, shape, curvature, taper, spacing, etc., of the side portions 48 may be customized to provide any desired headrest size, shape, curvature, etc.

Figure 3:
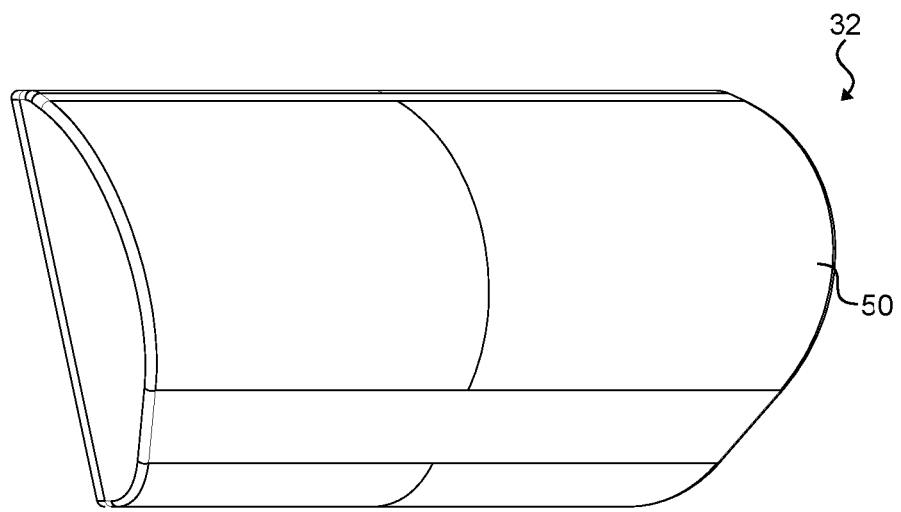
FIG. 3 is a front perspective view of a headrest assembly shown removed from a passenger seat.

FIG. 3 shows a complete headrest assembly 32 with the fabric cover 50 stretched over the underlying wire frame to hold the fabric cover tensioned and taught. The general U-shape of the frame and stretched fabric cover 50 together create a hollow pocket immediately behind the fabric cover. The fabric cover 50 is tensioned on the flexible wire frame such that the resting shape of the headrest is as shown in FIG. 3. In use, the hollow pocket allows the center of the fabric cover to depress inward toward the headrest plate to support the head in a concave curve to cradle the head of the seat occupant. The front of the headrest in the resting shape has a curvature from top-to-bottom while the headrest tapers in width towards the bottom.

Figure 4:
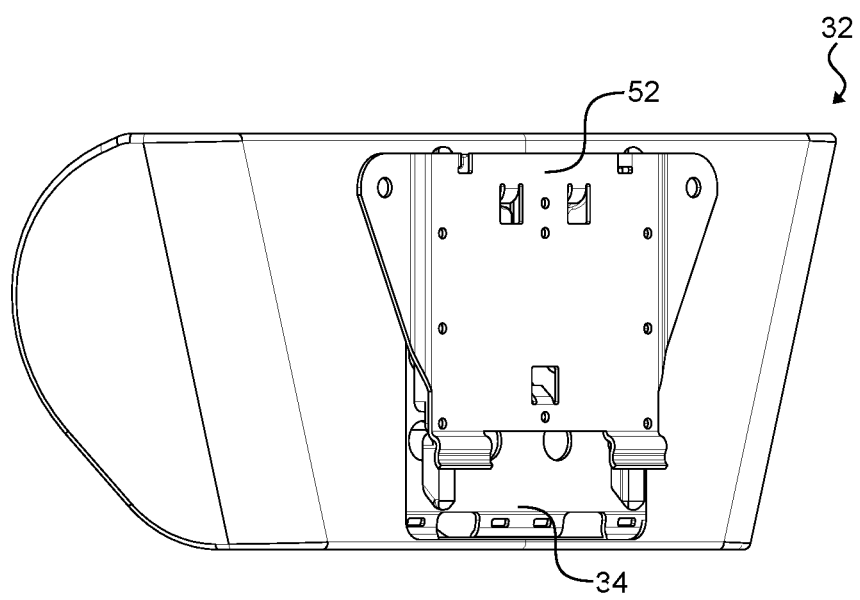
FIG. 4 is a rear perspective view of the headrest assembly shown in FIG. 3.

FIG. 4 shows the back of the headrest assembly 32. As shown, the headrest plate 34 is coupled to a seat back plate 52 attachable to the seat back. The headrest plate 34 may be coupled to the seat back plate 52 through an adjustment mechanism. In this arrangement, the seat back plate 52 may be fixed to the seat back while the headrest assembly 32 is vertically adjustable relative to the seat back between a fully lowered position and a fully raised position through one or more intermediate positions. This allows the headrest position on the seat back to be adjusted up or down as needed. The length of travel of the headrest plate 34 may be determined by the adjustment mechanism. For example, vertical adjustment may be from 1-10 cm or more.

Figure 5:
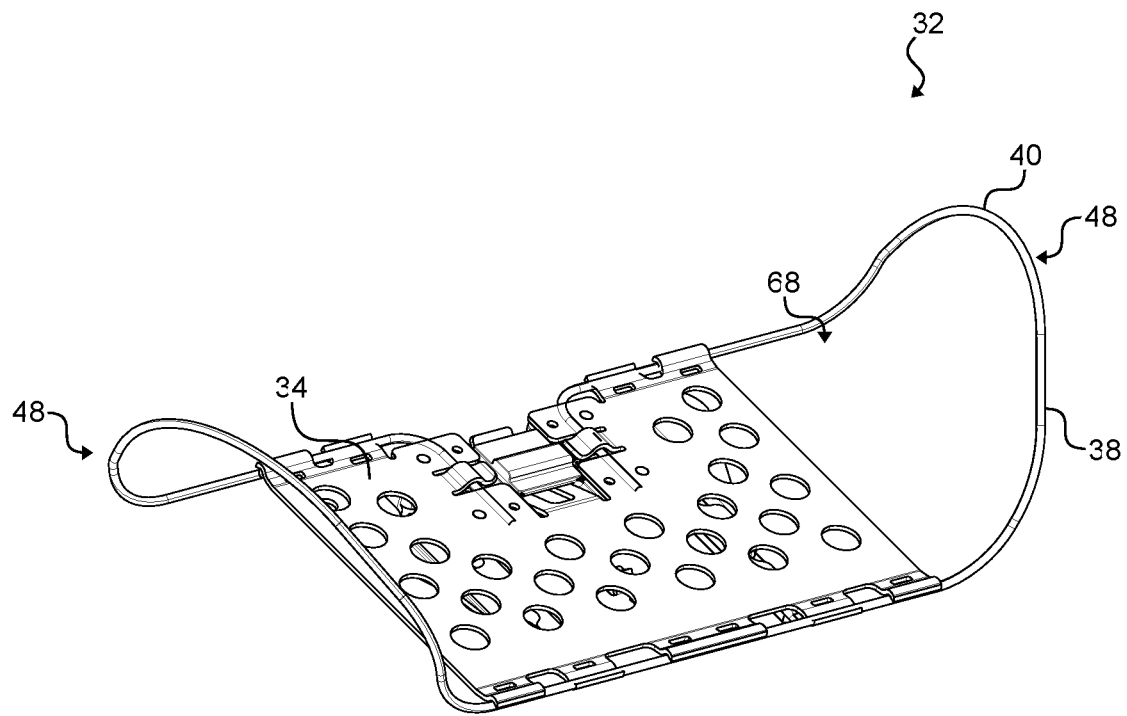
FIG. 5 is a front isometric view of the headrest assembly shown with the fabric cover removed.
Figure 6:
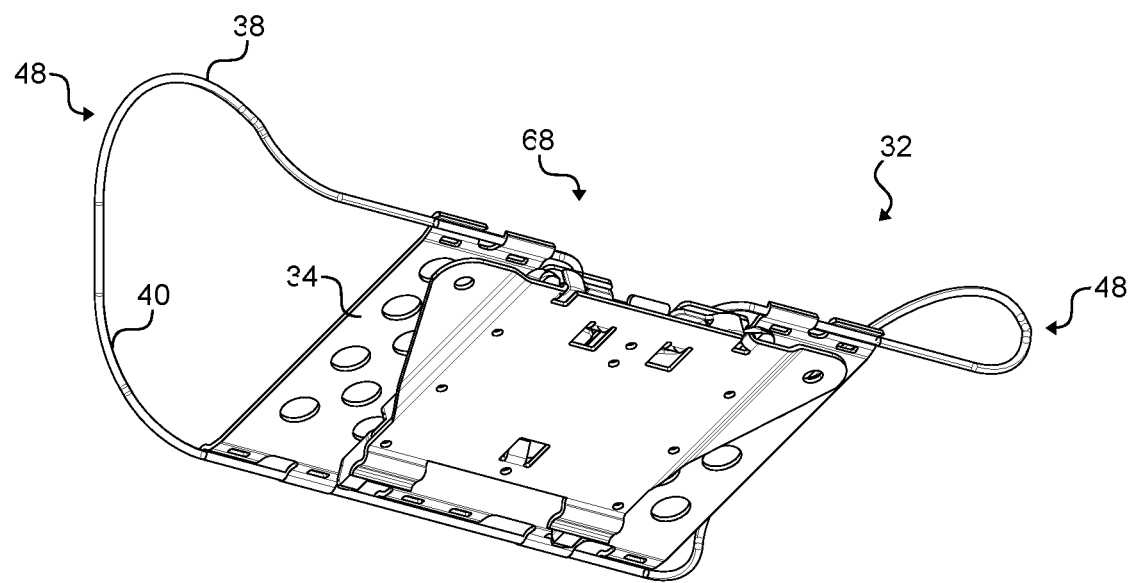
FIG. 6 is a rear isometric view of the headrest assembly shown with the fabric cover removed.

FIGS. 5 and 6 show respective front and back views of portions of the headrest assembly 32, and particularly the attachment of the flexible wire frame 38 to the headrest plate 34 and the predetermined shape of the metal wire 40 that supports the stretched fabric cover to create the hollow pocket behind the fabric cover. While the fabric cover is removed in FIGS. 5 and 6 for clarity, the headrest plate 34 is shown extending along the back of the assembly with the flexible wire frame 38 extending laterally followed by forward. As such, comparing FIG. 3 in which the fabric cover is installed with FIGS. 5 and 6 in which the fabric cover is removed, it is apparent that the hollow pocket 68 is created forward of the headrest plate 34 and between the side portions 48 of the flexible wire frame 38 immediately behind the fabric cover.

Figure 7:
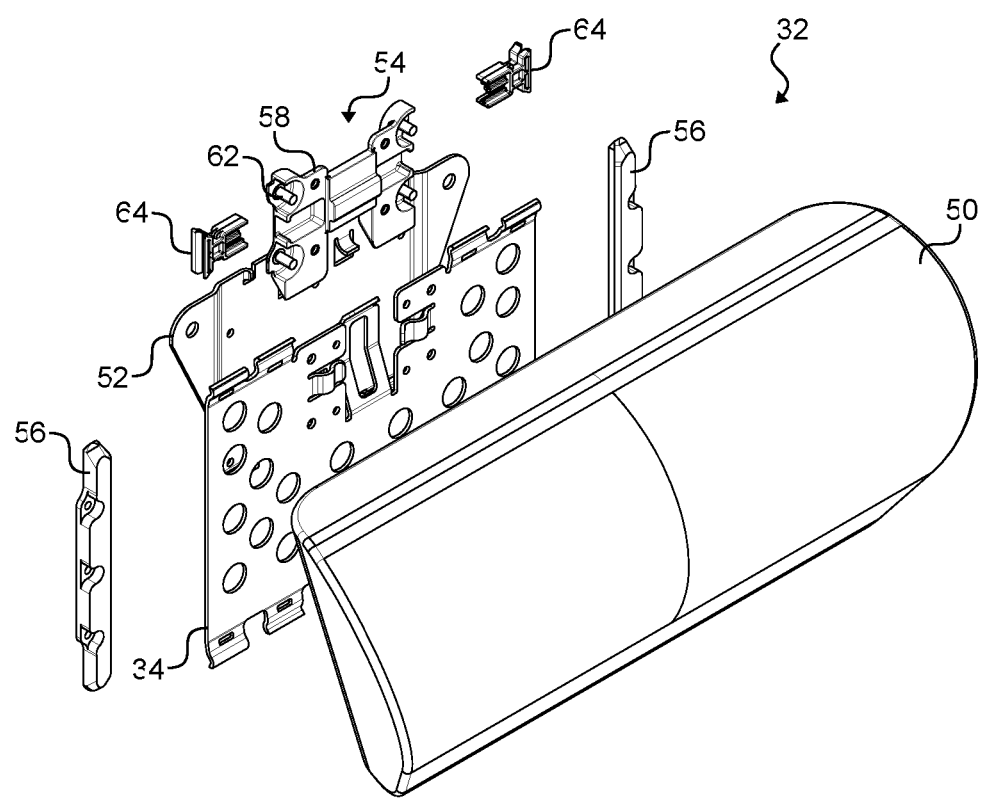
FIG. 7 is an exploded view of the headrest assembly shown with the fabric cover stretched over the flexible support structure.
Figure 8:
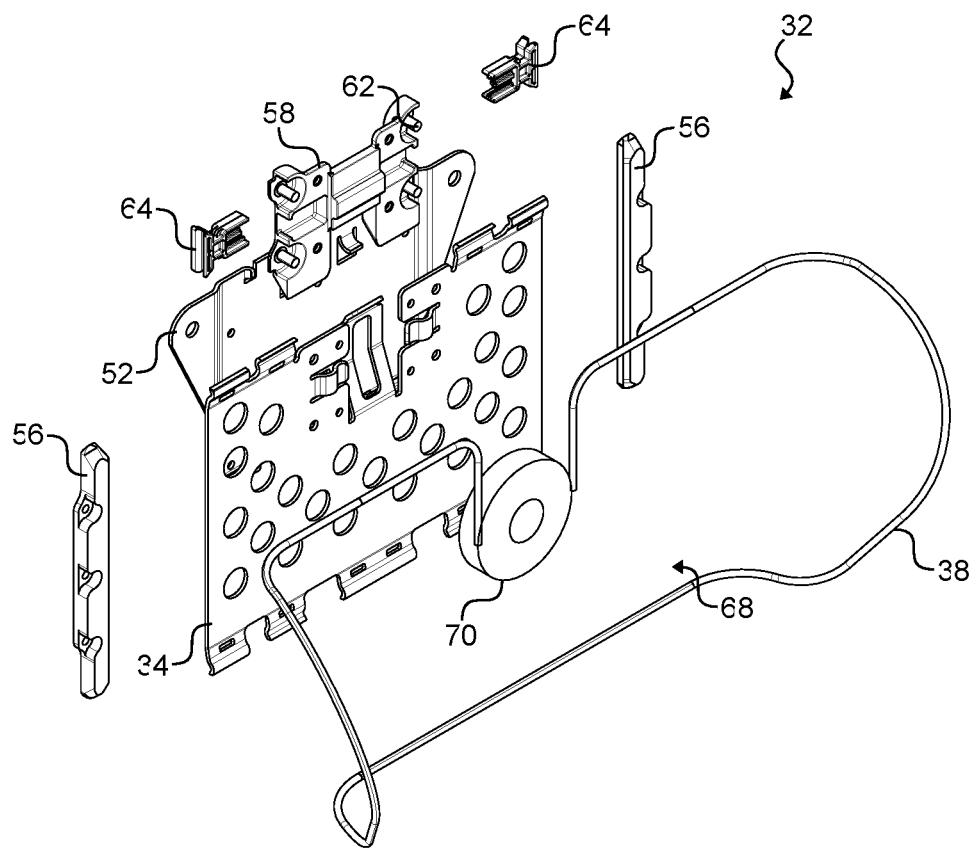
FIG. 8 is an exploded view of the headrest assembly shown with the fabric cover removed.

FIGS. 7 and 8 are exploded views of the headrest assembly 32 further including an optional adjustment mechanism 54. FIG. 7 shows the fabric cover 50 installed stretched over the wire frame, while FIG. 8 shows the fabric cover removed for clarity. The adjustment mechanism 54 is positioned between the headrest plate 34 and the seat back plate 52 and movable couples the two plates. Spaced elongate guide rails 56 attach to the seat back plate 52 and a guide 58 attaches to the headrest plate 34. The guide 58 is disposed between the spaced guide rails 56 and is guided for linear movement up or down relative to the guide rails. The guide 58 carries vertically-oriented rollers (see FIG. 10 at 60) rotatably mounted on posts 62. The plurality of rollers are engaged to roll along facing surfaces of the spaced guide rails 56 to facilitate smooth vertical movement while maintaining squareness.

The adjustment mechanism 54 may further include friction members 64 carried on the guide 58. The friction members 64 may have a flat face that contacts the flat facing surfaces on the guide rails 56 to enhance friction between the two surfaces to maintain the relative position of the head rest assembly. Thus, while the rollers facilitate smooth movement of the headrest assembly up and down, the friction members help maintain the headrest in a selected position. The friction members 64 may each be spring-biased in a direction of their respective guide rail.

Figure 9:
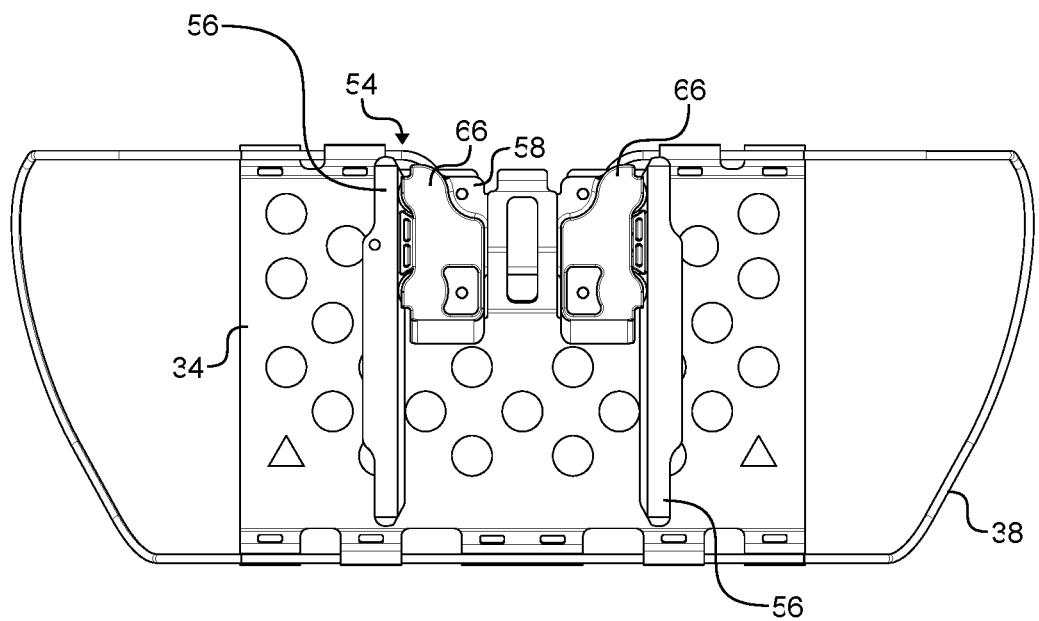
FIG. 9 is a back view of the headrest assembly shown with the seat back plate removed.
Figure 10:
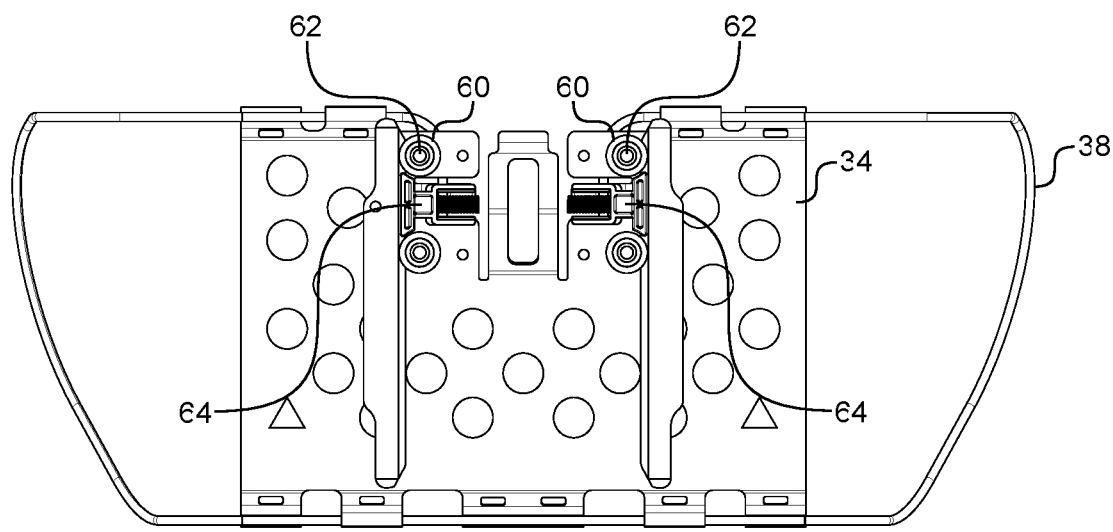
FIG. 10 is a back view of the headrest assembly shown with the guide covers removed.

FIG. 9 shows the back of the headrest assembly 32 with the seat back plate removed to reveal the adjustment mechanism 54. Covers 66 may attached to the guide 58 to maintain the rollers on their respective posts and friction members in their respective recesses. FIG. 10 shows the adjustment mechanism 54 with the covers removed to show the rollers 60 on their posts 62 and friction members 64 in their respective recesses.

Referring again to FIG. 8, one or more of a speaker, air vent or other device, indicated by item 70, may be located in the hollow pocket 68 of the headrest assembly. Associated venting or cabling may be routed behind the speaker or vent or down into the seat back. The item 70 preferably has a shallow depth to maximize the pocket depth to allow room for the fabric cover to depress. Alternatively, the item 70 may be located closer to one of the side portions. The fabric cover 50 can be constructed from any material. Preferable fabrics are elastic fabrics and seams are preferably located at the frame member locations and away from contact with the head and neck. The fabric cover may be constructed with a pocket having an elastic opening to stretch the opening and the cover over the wire frame.

While headrest assemblies and certain features, aspects and advantages of the assemblies have been described herein, the foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A headrest assembly, comprising:
a seat back plate attachable to a front side of a seat back;
a headrest plate movably coupled to the seat back plate;
an adjustment mechanism for adjusting a position of the headrest plate relative to the seat back plate, the adjustment mechanism comprising:
spaced guide rails attached to one of the seat back plate and the headrest plate; and
a guide attached to the other one of the seat back plate and the headrest plate, the guide disposed between the spaced guide rails and carrying rollers engaged to roll along the spaced guide rails and friction members engaging the spaced guide rails;
a flexible support structure attached to the headrest plate; and
a fabric cover stretched over the flexible support structure to create a hollow pocket behind the fabric cover and forward of the headrest plate.

2. The headrest assembly of claim 1, wherein the flexible support structure is a flexible wire frame having a shape that induces a concave curve in a center portion of the fabric cover for cradling a head of a seat occupant.

3. The headrest assembly of claim 2, wherein the flexible wire frame has a center portion parallel to the plate and side portions that extend forward in a direction away from the plate, wherein the side portions are symmetrical, curved and angle outward.

4. The headrest assembly of claim 3, wherein the fabric cover is tensioned on the flexible support structure and suspended between the side portions.

5. The headrest assembly of claim 1, wherein the friction members are biased toward their respective one of the spaced guide rails.

6. A passenger seat, comprising:
   a seat back;
   a headrest assembly attachable to a front side of the seat back, the headrest assembly comprising:
   i. a headrest plate;
   ii. a flexible wire frame attached to the headrest plate; and
   iii. a fabric cover stretched over the flexible wire frame and tensioned to create a hollow pocket behind the fabric cover and forward of the headrest plate;
   a seat back plate attached to the front side of the seat back; and
   an adjustment mechanism movably coupling the headrest plate to the seat back plate, the adjustment mechanism comprising:
   spaced guide rails attached to one of the seat back plate and the headrest plate; and
   a guide attached to the other one of the seat back plate and the headrest plate, the guide carrying rollers engaged to roll along the spaced guide rails and friction members engaging the spaced guide rails.

7. The passenger seat of claim 6, wherein the flexible wire frame has a shape that induces a concave curve in a center portion of the fabric cover for cradling a head of a seat occupant.

8. The passenger seat of claim 6, wherein the flexible wire frame has a center portion parallel to the plate and side portions that extend forward in a direction away from the plate, and wherein the side portions are symmetrical, curved and angle outward.

\* \* \* \* \*